United States Patent
Christopher

[15] 3,660,063
[45] May 2, 1972

[54] METHOD OF FORMING SEALED CONTAINER FOR ELEMENTAL SODIUM

[72] Inventor: Harold A. Christopher, Scotia, N.Y.
[73] Assignee: General Electric Company
[22] Filed: July 15, 1970
[21] Appl. No.: 62,754

Related U.S. Application Data

[62] Division of Ser. No. 811,014, Mar. 27, 1969, Pat. No. 3,579,382.

[52] U.S. Cl. .................................... 65/36, 65/43, 65/59, 136/20
[51] Int. Cl. ............................. H01m 21/14, C03b 23/20
[58] Field of Search ............... 65/36, 43, 59; 136/20, 6, 153, 136/120

[56] References Cited

UNITED STATES PATENTS

| | | | |
|---|---|---|---|
| 3,061,664 | 10/1962 | Kegg | 65/43 X |
| 3,241,217 | 3/1966 | Nunn | 65/43 X |
| 3,264,205 | 8/1966 | Leonard et al. | 65/36 X |
| 3,413,150 | 11/1968 | Kummer et al. | 136/6 |
| 3,458,356 | 7/1969 | Kummer et al. | 136/6 |
| 3,468,709 | 9/1969 | Kummer | 136/6 |

Primary Examiner—S. Leon Bashore
Assistant Examiner—Robert L. Lindsay, Jr.
Attorney—Richard R. Brainard, Paul A. Frank, Joseph B. Forman, Charles T. Watts, Paul R. Webb, II, Frank L. Neuhauser and Oscar B. Waddell

[57] ABSTRACT

An evacuated, sealed container for pure elemental sodium is disclosed which has an open-ended casing of an ionic conducting material sealed at one end with a high temperature ceramic plug by means of a high melting point sodium resistant glass, an electronic conductor in contact with the interior surface of the ionic conducting material and extending outwardly from the casing, and a seal at the other end of the casing. Such a container provides a suitable device for storing and dispensing pure elemental sodium, or provides a sodium electrode with an associated ionic conducting electrolyte. Methods are also described for forming evacuated, sealed containers for pure elemental sodium.

2 Claims, 1 Drawing Figure

PATENTED MAY 2 1972
3,660,063
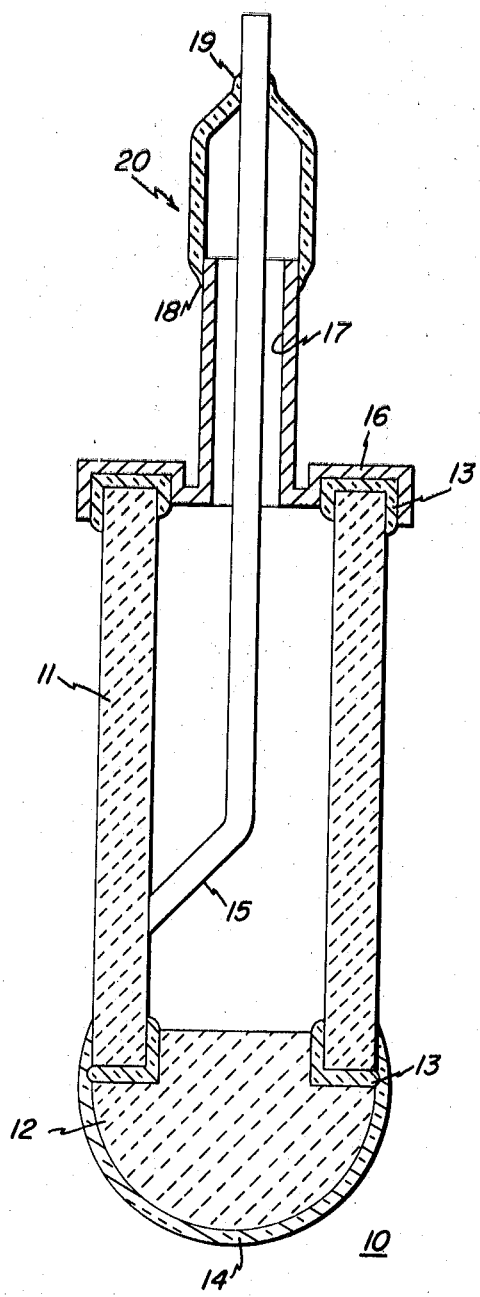
INVENTOR:
HAROLD A. CHRISTOPHER
by Paul R. Webb, II
HIS ATTORNEY

METHOD OF FORMING SEALED CONTAINER FOR ELEMENTAL SODIUM

This application is a division of application Ser. No. 811,014, filed Mar. 27, 1969, now U.S. Pat. No. 3,579,382, granted May 18, 1971 and assigned to the same assignee as the present application.

This invention relates to sealed containers and methods of making such containers, and, more particularly, to evacuated, sealed containers for pure elemental sodium, and to methods of making such containers.

In my copending application given Ser. No. 811,015, filed Mar. 27, 1969, now U.S. Pat. No. 3,607,405, granted, Sept. 21, 1971, there is disclosed and claimed an evacuated, sealed container for pure elemental sodium which has a casing, an ionic conducting portion in the casing, and an electronic conductor in contact with the interior surface of the ionic conducting portion and extending outwardly from the casing. There is also disclosed and claimed such a container filled with pure elemental sodium. Further, that application discloses and claims a method of forming such an evacuated, sealed container and a method of filling the container with pure elemental sodium.

The present application is directed to an improved evacuated, sealed container for pure elemental sodium which is an improvement over the above-identified copending application. The container of this application has increased mechanical strength and decreased internal stress, and provides for a higher production rate. Methods of forming such containers are also disclosed.

It is a primary object of my invention to provide an improved evacuated, sealed container for storing and dispensing pure elemental sodium, which container has good mechanical strength and low internal stress.

It is a further object of my invention to provide a method of forming such an evacuated, sealed container.

In accordance with one aspect of my invention an evacuated, sealed container for pure elemental sodium comprises an open-ended casing of an ionic conducting material, a high temperature ceramic plug in one end of the open casing, a high melting point, sodium resistant glass seal between the casing and the plug, a high melting point, sodium resistant glass seal over the exterior surface of the plug and the casing area adjacent the end of the casing, and an electronic conductor in contact with the interior surface of the ionic conducting material and extending outwardly from the other sealed end of the casing.

These and various other objects, features and advantages of the invention will be better understood from the following description taken in connection with the accompanying drawing in which:

The single FIGURE of the drawing is a sectional view of an evacuated, sealed container for pure elemental sodium made in accordance with my invention.

In the drawing, there is shown generally at 10 an evacuated, sealed container for pure elemental sodium which comprises an open-ended casing 11 of an ionic conducting material such as sodium beta-alumina which has a high temperature ceramic plug 12 of material such as alpha-alumina positioned in one end of the casing and a high melting point, sodium resistant glass seal 13 between casing 11 and plug 12 thereby sealing the plug to the casing. The high melting point, sodium resistant glass seal 14 covers the exterior surface of the plug and the casing area adjacent to the end of casing 11.

An electronic conductor in the form of a wire lead 15 is in contact with the interior surface of casing 11, and extends upwardly through the opposite open end of casing 11. A cover 16 with an aperture 17 therein, which is shown as a metal spinning, is sealed to the other end of casing 11 by means of the same high melting point, sodium resistant glass seal 13 which is positioned between the end of the casing and the cover. One end of a high temperature glass tube is sealed to the open end of the metal spinning at 18. After evacuation and helium leak testing, the other end of the glass tube is sealed at 19 to conductor 15 providing a glass seal 20. In this manner, lead 15 extends outwardly from the sealed end of the evacuated, sealed container 10.

I discovered unexpectedly that I could form an evacuated, sealed container for storing and dispensing pure elemental sodium which comprises an open-ended casing of an ionically conducting material which has a high temperature ceramic plug sealed in one end thereof by means of a high melting point, sodium resistant glass, while the other end is sealed by means of a metal spinning affixed to the casing by means of a high melting point, sodium resistant glass. An electronic conductor in the form of a wire lead is in contact with the interior surface of the casing and extends outwardly through the aperture in the cover. The container is evacuated through the glass tube aperture and sealed by joining the upper edge of the high melting point, sodium resistant glass tube to the lead. Such a container can be electronically filled with pure elemental sodium thereby providing an evacuated, sealed storage container for high purity sodium, a dispenser for the sodium, or provides an anode-electrolyte assembly for subsequent use as a sodium electrode, for example, in a sodium-sulfur power source.

I found further that when the casing of ionically conducting material has a high temperature ceramic seal inserted in one end and sealed thereto by means of a high temperature, sodium resistant glass, a uniform structure with good mechanical strength and decreased internal stress is attained which can be manufactured at a higher production rate. The other open end of the casing can be sealed in the manner described above with the metal spinning or can be sealed by affixing one end of a glass tube to the open end of the casing, and after evacuation of the casing the other end of the glass tube is then sealed to the conductor forming an evacuated, sealed container. I found, however, that a metal cap with an aperture therein in the form of a metal spinning which is sealed to the upper open end of the casing and to the conductor by its associated glass seal provides a preferred structure.

I found further that such an evacuated, sealed container can be formed by providing an open-ended casing which is made of an ionic conducting material such as sodium beta-alumina. One end of the casing has a high melting point, sodium resistant glass suspension applied thereon after which a high temperature ceramic plug of a material such as alpha-alumina is positioned in the opening in contact with the glass suspension and coated further with the same glass suspension over its exterior surface and on the adjacent exterior surface of the casing. After the glass suspension has dried, the casing is heated in air, for example, in an air furnace, at a temperature in the range of 925° to 1,100° C., preferably 1,000° C., for a period in the range of 1 minute to 5 minutes, preferably 3 minutes, whereby the glass from the glass suspension fuses and provides a sealed structure between the casing and the plug, and covers the exterior surface of the plug and the casing area adjacent the end of the casing. An electronic conductor is then placed in contact with the interior surface of the casing and extends outwardly from the casing which is sealed at its opposite end.

Such a seal is provided preferably by a metal cover with an aperture therein in the form of a metal spinning through which the conductor extends and to which the associated glass tube extending from the metal spinning is sealed. Such a seal is formed by applying a high melting point, sodium resistant glass suspension adjacent the opposite open end of the casing. A metal spinning is positioned against the open end of the casing in contact with the glass suspension. The metal spinning has a glass tube sealed to its opposite end.

After the above glass suspension has dried, the casing is heated in air, for example in an air furnace, at a temperature in the range of 925° to 1,100° C. for a period in the range of 1 minute to 5 minutes whereby the glass from the glass suspension fuses and provides a sealed structure between the casing and the cover. After the casing has been evacuated and preferably simultaneously helium leak tested through the glass tube, the upper edge of the tube can be sealed to the conductor thereby providing the second sealed end for the container.

The ionic conducting material of the open-ended casing is preferably made of sodium beta-alumina which is not a form of aluminum oxide $Al_2O_3$, but is sodium aluminate with the generally accepted formula $Na_2O \cdot 11\ Al_2O_3$. The high ionic conductivity of this material has been previously recognized in the literature. This material is known as an ionic conducting material or as an ionic solid electrolyte in that associated reactive materials are constrained to combine by ion transport through the material and electron transport through an external circuit where the free energy change corresponding to the cell reaction is extracted as useful electrical energy. Sodium beta-alumina is used as a solid ionic conducting material or electrolyte in a sodium-sulfur battery which is described for example in U.S. Pat. Nos. 3,404,035 — Kummer et al., issued Oct. 1, 1968; 3,404,036 - Kummer et al., issued Oct. 1, 1968; or 3,413,150 — Kummer et al, issued Nov. 26, 1968. Other ionic conducting materials are suitable for such containers, which materials include glasses, principally those in the sodium-alumina-silica system.

The high temperature ceramic end plug can be made of a wide variety of materials and in a wide variety of configurations. I prefer to employ a pre-fired plug of alpha-alumina or of sodium beta-alumina. Various high temperature glasses which are sodium resistant can be employed to seal the plug to the casing, to seal the metal spinning to the casing, and to seal the metal spinning to the conductor. I prefer to employ a glass having a composition of 50.0% $SiO_2$, 10.0% $B_2O_3$, 10.0% $Al_2O_3$ and 30.0% BaO. The percentages are weight percentages. Such a glass is used by mixing a suspension of such a glass in powder form with alcohol to provide a suspension which is easily applied as by painting on the particular part of the casing or plug.

The electronic conductor can be made of a wide variety of materials and in a wide variety of configurations. While the electronic conductor is shown in the drawing as a wire lead in contact with the interior surface of the ionic material of the container, such a conductor can take the form of a lead with additional material such as an electrically conductive mesh or wool adjacent to the interior surface to provide an increased area of contact. Since the material to be employed within the container is liquid or solid sodium, metals for such an electronic conductor include nickel, stainless steels, Armco iron, etc.

The evacuated, sealed container of my invention provides a suitable device for storing and dispensing elemental sodium, or provides a sodium electrode with an associated ionic conducting electrolyte.

In an illustrative operation of the evacuated, sealed container shown in the single FIGURE of the drawing, at least a portion of the ionic conducting material of the container is immersed in a bath within a crucible with a cover having an opening therein. The crucible is filled with a suitable source of sodium ions such as, for example, a sodium polysulfide, sodium hydroxide, sodium nitrate, elemental sodium, etc. The sodium compound is maintained at a sufficiently elevated temperature so that it is in the molten condition. For example, sodium polysulfide is maintained at about 300° C. while elemental sodium is maintained at about 100° C. to be in a molten state. With either of these sodium ion sources, the above cover would be employed. The electronic conductor of the container is connected to a lead which in turn is connected to the negative terminal of a D.C. power source such as a battery. The positive terminal of the battery is connected by a lead to the crucible which serves as the counter electrode.

A D.C. potential is then applied whereupon sodium ions from the sodium polysulfide bath are transported through the ionic conducting material of the casing and discharged initially on the electronic conductor in contact with the ionic conducting portion and subsequently at the interface of the sodium and the ceramic. After the container has been filled with liquid sodium, the power supply is discontinued, the evacuated, sealed container is removed from the molten bath, the lead is disconnected from the electronic conductor, and the evacuated, sealed container is cooled. This process results in an evacuated, sealed container filled with pure metallic sodium. The filled container can be stored in air with no adverse effect on the contained sodium. Additionally, the sealed container constitutes a sodium electrode with an associated ionic conducting electrolyte which can be employed, for example, with a sulfur cathode to form a sodium-sulfur battery, or the sodium can be electrochemically dispensed from this container for other uses of the pure elemental sodium.

Examples of evacuated, sealed containers and methods of forming such evacuated, sealed containers in accordance with my invention are set forth below:

EXAMPLE 1

A plurality of evacuated, sealed containers were made as shown in the single FIGURE of the drawing. Each container was made by milling sodium beta-alumina powder to a particle size less than about one and preferably greater than one-third micron in maximum diameter. To the resulting powder was added sodium carbonate of a similar particle size, bringing the concentration of the sodium oxide to about 5 to 6 percent of the mixture and hence close to the composition for $Na_2O \cdot 11\ Al_2O_3$. This powder was then mixed with a sodium hydroxide solution to form a slurry which was extruded in a conventional manner in the form of a continuous, thin walled tube. After drying in air, the tube was cut into convenient lengths which were fired in an oxygen rich atmosphere at about 1,825° C. for a period of 2 hours. This resulted in a fired or finished casing for each of the containers.

A high melting point glass in powder form was mixed with alcohol to form a glass suspension which was applied to the open ends of each casing. The glass, which is resistant to sodium, had a composition in weight percentage of 50.0% $SiO_2$, 10.0% $B_2O_3$, 10.0% $Al_2O_3$ and 30.0% BaO. An alpha-alumina plug was positioned in one open end of the casing in contact with the glass suspension. The same glass suspension was applied over the exterior surface of the plug and the casing area adjacent the associated end of the casing. A metal spinning composed of an alloy comprising 20 percent nickel, 17 percent cobalt, 0.2 percent manganese and the balance iron was positioned over the opposite open end of the casing in contact with the glass suspension. The other end of the spinning had one end of a glass tube of the above glass composition sealed to it. The casing was then dried in air after which it was heated in an air furnace at a temperature of 1,000° C. for 5 minutes. The glass from the glass suspensions fused and provided a sealed structure between the casing and the plug and between the casing and the metal spinning.

An electronic conductor in the form of a 1/16-inch metal rod of an alloy of the same composition as the cover was positioned within each casing with one end in contact with the interior surface of the sodium beta-alumina ionic conducting material. The other end of the metal rod extended outwardly through the cover aperture. With the metal rod held in position within each casing, the other end of the glass tube, which was sealed to the open end of the metal spinning, was connected to the vacuum system of a helium leak detector. A resistance heater was positioned around this assembly which was heated to a temperature of about 350° C. for 2 hours while the system was evacuated and helium leak tested. The glass tube was joined subsequently to the lead thereby forming a leak-tight seal with the lead. This method resulted in producing a plurality of evacuated, sealed containers each of which had an open-end casing of ionic conducting material of sodium beta-alumina, an alpha-alumina plug sealed at one end, a metal spinning sealed to the other end of the casing, and a glass seal between the metal spinning and the electronic conductor.

EXAMPLE 2

A sealed container as formed above in Example 1 was immersed in a molten bath of sodium polysulfide contained in a graphite crucible having a cover with a central aperture therein. The electronic conductor from the container was connected to the negative terminal of a battery power source while the positive terminal of the battery was connected to the crucible. Power was supplied at 3 to 4 volts and at a current from 10 milliamperes to 1 ampere over a period of 120 minutes during which time sodium ions from the sodium polysulfide bath were transported ionically through the beta-alumina material and discharged within the interior of the evacuated, sealed container. The power was then discontinued and the evacuated, sealed container removed from the bath. The battery lead was disconnected and the casing was allowed to cool. This resulted in an evacuated, sealed container of the above type filled with pure elemental sodium.

EXAMPLE 3

An evacuated, sealed container as formed above in Example 1 was immersed in a molten bath of sodium hydroxide contained in an open graphite crucible. The electronic conductor from the container was connected to the negative terminal of a battery power source while the positive terminal of the battery was connected to the crucible. Power was supplied at 3 volts and at a current from 10 milliamperes to 1 ampere over a period of 60 minutes during which time sodium ions from the sodium hydroxide bath were transported ionically through the beta-alumina material and discharged into the interior of the evacuated, sealed container. The power was then discontinued and the evacuated, sealed container removed from the bath. The battery lead was disconnected and the casing was allowed to cool. This resulted in an evacuated, sealed container of the above type filled with pure elemental sodium.

EXAMPLE 4

A sealed container as formed above in Example 1 was immersed in a molten bath of sodium nitrate contained in an open graphite crucible. The electronic conductor from the container was connected to the negative terminal of a battery power source while the positive terminal of the battery was connected to the crucible. Power was supplied at 3 volts and at a current from 10 milliamperes to 1 ampere over a period of 60 minutes during which time sodium ions from the sodium nitrate bath were transported ionically through the beta-alumina material and discharged within the interior of the evacuated, sealed container. The power was then discontinued and the evacuated, sealed container removed from the bath. The battery lead was disconnected and the casing was allowed to cool. This resulted in an evacuated, sealed container of the above type filled with pure elemental sodium.

EXAMPLE 5

A sealed container as formed above in Example 1 was immersed in a molten bath of elemental sodium contained in a nickel crucible having a cover with a central aperture therein. A nitrogen gas blanket was provided above the cover. The electronic conductor from the container was connected to the negative terminal of a battery power source while the positive terminal of the battery was connected to the crucible. Power was supplied at 3 to 4 volts and at a current from 10 milliamperes to 1 ampere over a period of 120 minutes during which time sodium ions from the elemental sodium bath were transported ionically through the beta-alumina material and discharged within the interior of the evacuated, sealed container. The power source was then disconnected and the evacuated, sealed container removed from the bath. The battery lead was disconnected and the casing was allowed to cool. This resulted in an evacuated, sealed container of the above type filled with pure elemental sodium.

EXAMPLE 6

An evacuated, unfilled, sealed container which was formed in accordance with Example 1 was tested for electrochemical stability by electrolytically cycling sodium through the sodium beta-alumina casing portion for 50 hours. The apparatus comprised an oil bath heated to a temperature of 200° C. in which was positioned a high melting point, sodium resistant glass tube filled partially with molten sodium. An evacuated, unfilled, sealed container of my invention was immersed in the molten sodium within the glass tube. The electronic conductor from the container and a similar conductor immersed partially within the sodium within the glass tube were extended outwardly through a stopper in the upper open end of the glass tube. These conductors were connected to a cycled D.C. power supply. After the above 50 hours at about 50 ma/cm$^2$, cycling was discontinued. The containers, which were examined, were still helium leak-tight. The glass seals showed no signs of crazing nor darkening.

EXAMPLE 7

An evacuated, sealed container which was formed in accordance with Example 5 was tested for electrochemical stability by electrolytically cycling sodium through the sodium beta-alumina casing portion for 50 hours. The apparatus comprised an oil bath heated to a temperature of 200° C. in which was positioned a high melting point, sodium resistant glass tube filled partially with stainless steel wool. An evacuated, sodium filled, sealed container of my invention was placed in contact with the wool within the glass tube. The electronic conductor from the container and a similar conductor in contact with the wool within the glass tube were extended outwardly through a stopper in the upper open end of the glass tube. These conductors were connected to a cycled D.C. power supply. After 50 hours at about 50 ma/cm$^2$, cycling was discontinued. The containers, which were examined, were still helium leak-tight. The glass seals showed no signs of crazing nor darkening.

While other modifications of the invention and variations threof which may be employed within the scope of the invention have not been described, the invention is intended to include such as may be embraced within the following claims:

What I claim as new and desire to secure by Letters Patent in the United States is:

1. A method for forming an evacuated, sealed container for pure elemental sodium which comprises providing an open-ended casing of an ionic conducting material, applying a high melting point, sodium resistant glass suspension adjacent one open end of the casing, positioning a high temperature ceramic plug in the open end of the casing in contact with the glass suspension, applying a high melting point, sodium resistant glass suspension over the exterior surface of the plug and the casing area adjacent the end of the casing, drying the suspension vehicle, heating the casing in air at a temperature in the range of 925° to 1,100° C. for a period in the range of 1 minute to 5 minutes whereby the glass from the glass suspensions fuses and provides a sealed structure between casing and plug and covers the exterior surface of the plug and the area adjacent the end of the casing, providing an electronic conductor in contact with the interior surface of the ionic conducting material and extending outwardly from the other end of the casing, evacuating the casing, and sealing the casing.

2. A method as in claim 1, wherein a high melting point, sodium resistant glass suspension is applied adjacent the opposite open end of the casing, a metal spinning is applied over the open end of the casing in contact with the glass suspension, one end of a glass tube is sealed to the open end of the metal spinning, the suspension vehicle is dried, the casing is heated in air at a temperature in the range of 925° to 1,100° C. for a period in the range of 1 minute to 5 minutes whereby the glass from the glass suspensions fuses and provides a sealed structure between the casing and the plug, the other end of the glass tube is connected to an evacuation system, the system is evacuated, and the glass tube is sealed to the conductor.

* * * * *